US008154951B2

(12) United States Patent
Armstrong

(10) Patent No.: US 8,154,951 B2
(45) Date of Patent: Apr. 10, 2012

(54) MODEL-BASED RELATIVE BEARING ESTIMATION OF THREE-COMPONENT RECEIVERS

(75) Inventor: Philip Neville Armstrong, Yokohama (JP)

(73) Assignee: Schlumberger Technology Corporation, Sugar Land, TX (US)

(\*) Notice: Subject to any disclaimer, the term of this patent is extended or adjusted under 35 U.S.C. 154(b) by 173 days.

(21) Appl. No.: 12/399,974

(22) Filed: Mar. 8, 2009

(65) Prior Publication Data

US 2010/0226207 A1 Sep. 9, 2010

(51) Int. Cl.
*G01V 1/48* (2006.01)
(52) U.S. Cl. ............................ 367/73; 367/25; 367/57
(58) Field of Classification Search ............ 33/304, 33/313; 340/853.8; 367/16, 25, 33, 38, 50, 367/57, 58, 73, 75; 702/6, 7, 11, 14, 16
See application file for complete search history.

(56) References Cited

U.S. PATENT DOCUMENTS 6,922,373 B2 \* 7/2005 Armstrong .................. 367/73
7,095,678 B2 \* 8/2006 Winbow et al. ............. 367/73

OTHER PUBLICATIONS

Becquey and Dubesset, "Three-Component Sonde Orientation in a Deviated Well," Geophysics, vol. 55, No. 10 (1990), pp. 1386-1388.

\* cited by examiner

*Primary Examiner* — Jack W Keith
*Assistant Examiner* — Daniel L Murphy
(74) *Attorney, Agent, or Firm* — Jianguang Du; Jody DeStefanis; Jeff Griffin

(57) ABSTRACT

A method is disclosed for more accurately determining the relative bearing angle of a directional receiver in a borehole using an existing three-dimensional (3D) geological model, one or more seismic sources and a three component (3C) directional receiver. A disclosed method includes: receiving direct compressional arrivals generated by multiple source events at the directional receiver disposed in the borehole; rotating the seismic data into the true earth frame using an estimated relative bearing angle; measuring a polarization vector of the rotated seismic data; estimating an incident ray vector of the direct compressional arrivals at the directional receiver using ray-tracing through the 3D model; calculating the weighted sum of an angular difference between the polarization vector and the incident ray vector; and adjusting the estimated relative bearing angle until the angular difference between the polarization and incident ray vectors is minimized.

39 Claims, 10 Drawing Sheets

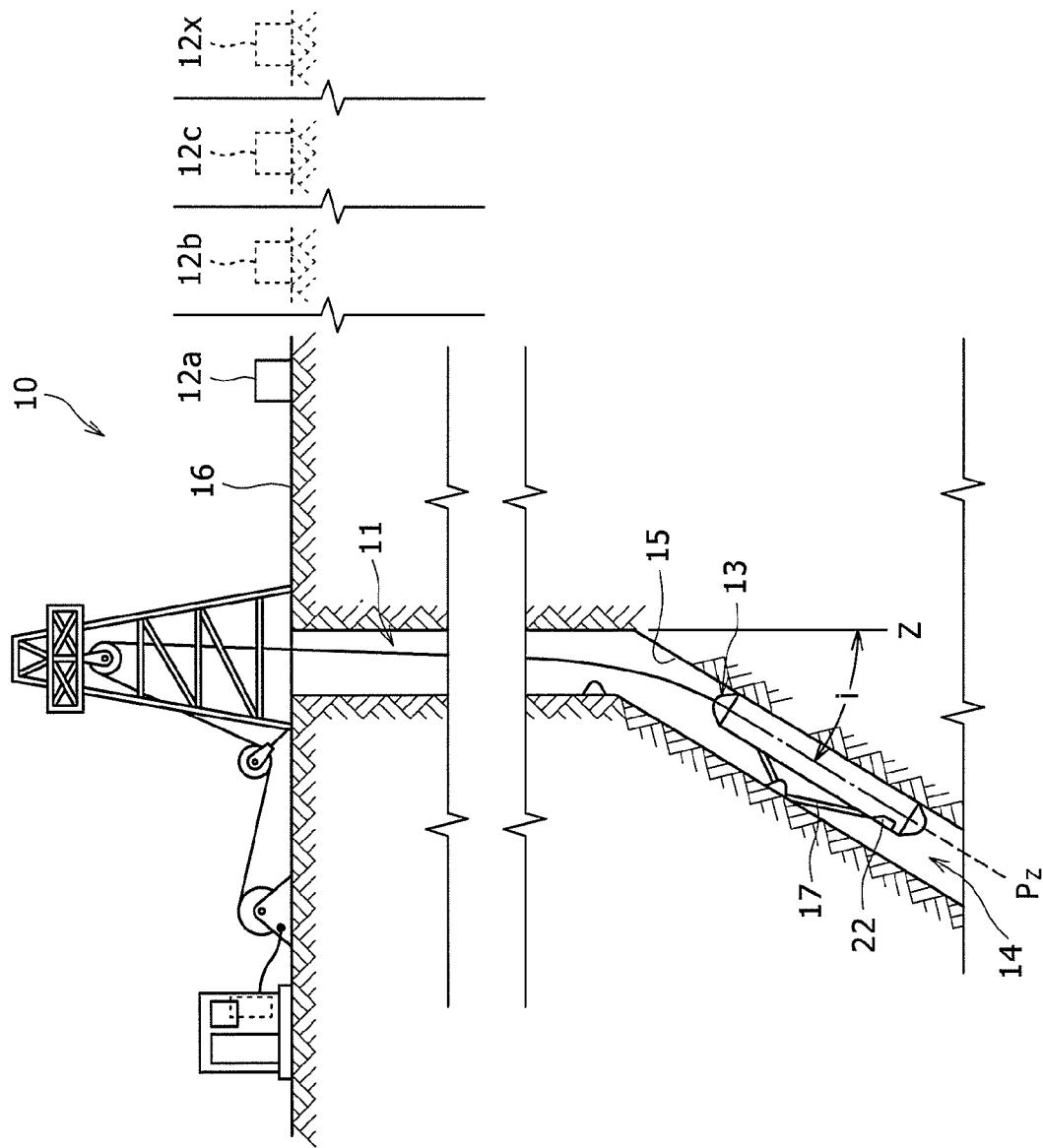

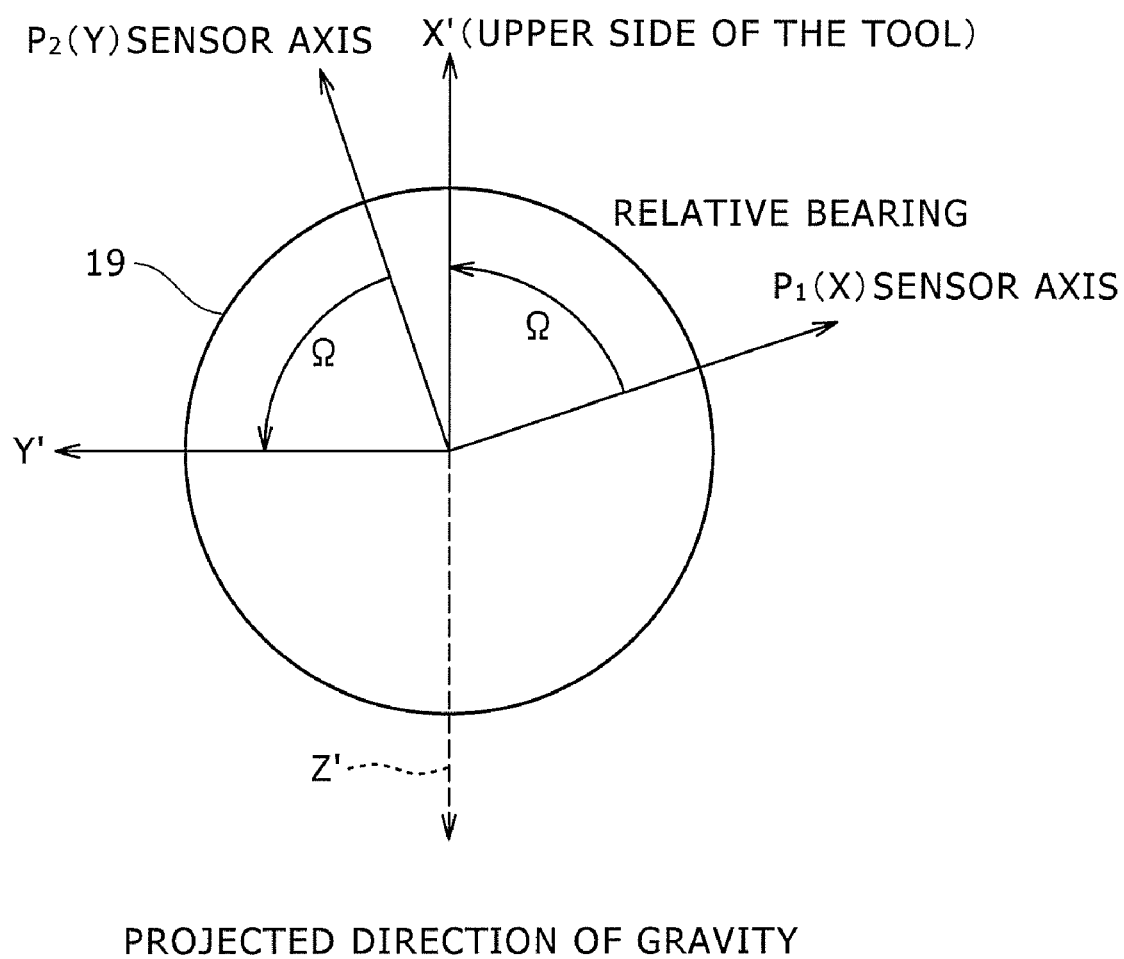

MINIMUM AT -106.3°

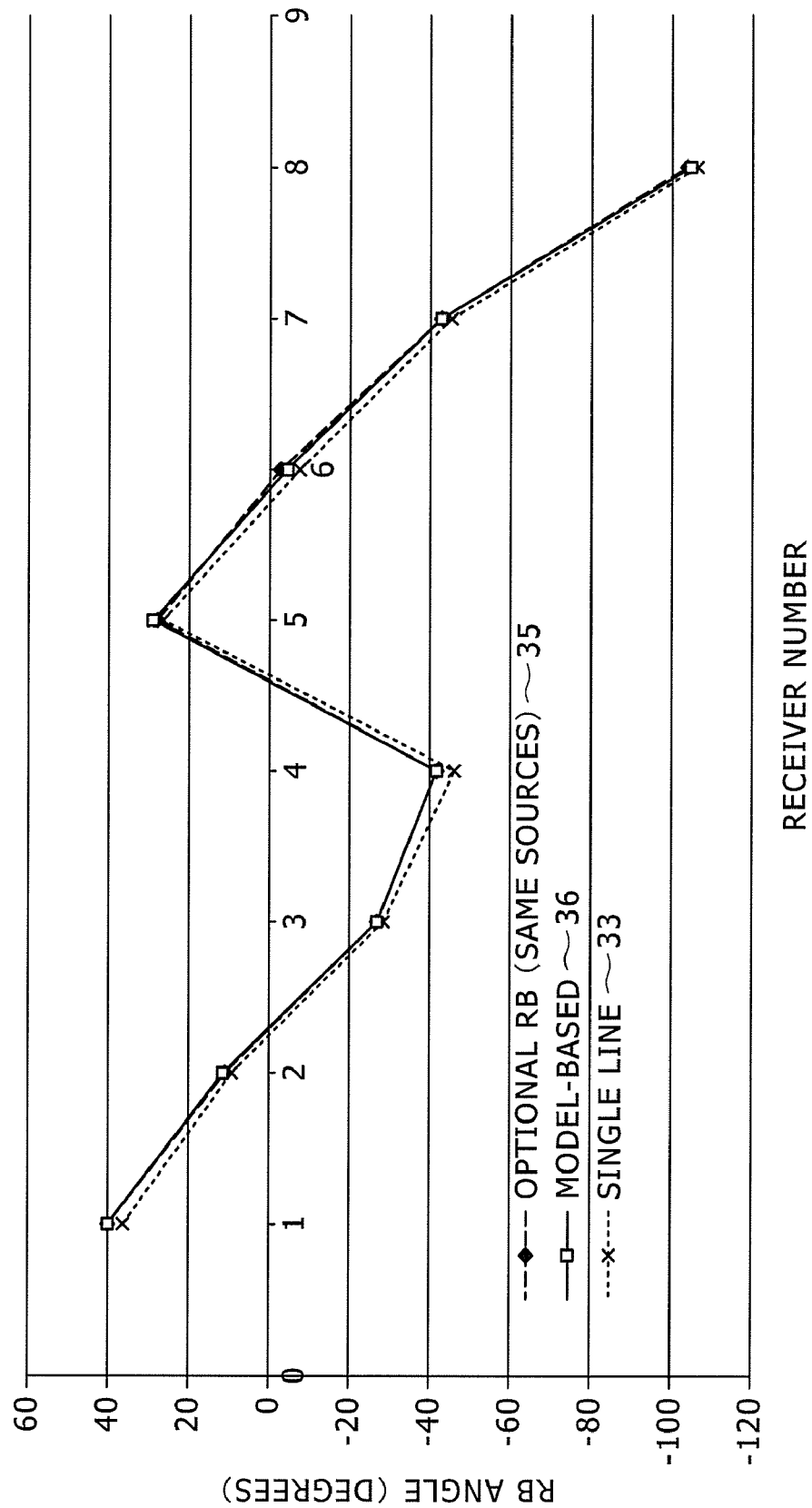

MODEL-BASED RELATIVE BEARING ESTIMATION OF THREE-COMPONENT RECEIVERS

BACKGROUND

1. Technical Field

This disclosure relates to data received by borehole seismic directional receivers and data such as vertical seismic profile (VSP) data. Still more specifically, this disclosure relates to a method for estimating the orientation of a multi-component (3C) directional receiver deployed in vertical or deviated boreholes.

2. Description of the Related Art

In recent years, offshore exploration and development of hydrocarbon reserves has been conducted at increasingly deeper depths of water. As the water depths increase and the boreholes lengthen, recovery of formation fluids from subterranean formations becomes increasingly difficult and complex. However, rigorous analysis of subterranean formations has led to more efficient oil and gas recovery and vertical seismic profile (VSP) surveys have emerged as an important tool for analyzing subterranean formations so that the hydrocarbon fluids in the formations can be more efficiently recovered.

VSPs are a class of borehole seismic measurements used for correlation between surface directional receivers and wireline logging data. VSPs can be used to tie surface seismic data to borehole data, providing a useful tie to measured depths. Typically, VSPs yield higher resolution data than surface seismic profiles provide. VSPs enable the conversion of seismic data to zero-phase data, and distinguish primary reflections from multiple reflections. In addition, VSPs are often used for analysis of portions of a formation ahead of the drill bit.

VSPs are seismic measurements made in a borehole using one or more downhole receivers and a seismic source at the surface near the wellsite. VSPs can vary in well configuration, such as the number and location of sources and receivers, and how the sources and receivers are deployed. Conventional VSPs use a surface seismic source, which is commonly a vibrator on land, or an air-gun in marine environments. More recent offshore techniques involve the use of a seismic source placed at the ocean floor and spaced away from the borehole.

When using a non-gimbaled multi-component receiver, seismic waves are received relative to the orientation of the seismic receiver and measured on a coordinate system specific to the seismic receiver. For example, a three component (3C) receiver measures received seismic waves on three orthonormal axes. Typically, however, it is desirable to interpret the measured seismic data in another coordinate system, such as a true earth frame (northing, easting, vertical). Thus, data received relative to the coordinate system of each non-gimbaled receiver requires rotation to the desired coordinate system for subsequent use.

Referring to FIG. 1, a general illustration is shown of a VSP survey 10 being conducted on a deviated well or borehole 11. A seismic source 12a, 12b, 12c or 12x, depicted in FIG. 1 as being on the surface generates a seismic signal to be detected by the downhole directional receiver 13 that is non-gimbaled. The seismic sources 12a, 12b, 12c and 12x are illustrative of a plurality of seismic generators placed at various azimuths around the borehole 11. The borehole 11 has a deviated portion 14 that deviates from a true vertical axis Z at an angle i. The directional receiver 13 is shown deployed along the deviated portion 14 of the borehole 11. The directional receiver 13 is coupled to the low side 15 of the borehole 11 by a decentralizer 17 for receiving seismic signals generated from the seismic source 12a, 12b, 12c or 12x 12 on the surface 16. As shown in FIG. 1, the longitudinal axis $P_z$ of the directional receiver 13 is oriented at an angle i from the true vertical axis Z. Therefore, in addition to the angle i, to properly orient the directional receiver 13 in an XYZ coordinate system where Z is true vertical, the relative bearing angle $\Omega$ of the directional receiver 13 (see FIGS. 2A-2B) needs to be determined. For a deviated borehole like the one shown at 11 in FIG. 1, the relative bearing angle $\Omega$ is the angle between the X-axis of the directional receiver 13 in the X-Y plane and the local vertical plane that passes through the well axis (or the longitudinal axis $P_z$ of the receiver 13) and true vertical Z as explained below in connection with FIGS. 2A-2B.

One method of determining the relative bearing angle is presented by Becquey and Dubesset in their paper entitled Three-Component Sonde Orientation in a Deviated Well, Geophysics, vol. 55, no. 10 (1990) which provides a more refined method. The method is ambiguous in that two possible relative bearings are calculated and determination of which is the correct relative bearing requires additional information or physical considerations.

FIG. 2A illustrates a method of determining the relative bearing angle that is disclosed in commonly assigned U.S. Pat. No. 6,922,373, which is incorporated herein by reference. A coordinate system ray diagram describes the geometric relationship between a non-gimbaled directional receiver 13 and a borehole 11 (FIG. 1). The three orthonormal axes of a directional receiver like the one shown at 13 in FIG. 1 are $P_1$, $P_2$, and $P_z$, where $P_z$ is the axis corresponding to the longitudinal axis of the directional receiver 13 in the deviated portion 14 of the borehole 11. The receiver plane 19 is defined by the $P_1$ and $P_2$ transverse axes and the plane 19 is normal to the longitudinal axis $P_z$. The preferred coordinate system X, Y, and Z is also shown in FIG. 2A, where Z is true vertical and the transverse or horizontal plane 21 is defined by the X and Y components. Orientating the P-wave arrival 18 into the preferred X, Y, and Z coordinate system requires either a full 3C rotation through the relative bearing angle $\Omega$, or a dividing the 3C rotation into two parts.

If the 3C rotation is split into two parts, one procedure is as follows: rotate through the relative bearing angle in the tool x-y ($P_1$-$P_2$) plane to give a new X and Y, where Y is horizontal and X' is in the local vertical well plane as shown in FIG. 2B; and rotate X' and $P_z$ through well deviation angle i (about Y) to give the final X and Z components. To perform either procedure, the relative bearing angle $\Omega$ must be known.

FIG. 2B further illustrates that the relative bearing angle $\Omega$ is in the X-Y plane 19 of the tool 13 and is the angle $\Omega$ between $P_1$ or X in the X-Y plane 19 and the local vertical plane that passes through the borehole 11 (represented by the vertical line Z' through the center). Therefore, rotating the $P_1$(X) and $P_2$ (Y) component data through the relative bearing angle $\Omega$, the rotated X' is in the local vertical plane of the borehole and the rotated Y' is horizontal (see also FIG. 2A). The '373 patent discloses a multi-step process for calculating the relative bearing angle $\Omega$ that includes: (1) estimating the relative bearing angle $\Omega$ using an approximate angle retrieved from a relative hearing sensor or other reasonable estimation method; (2) scanning angles of +/−25° around the estimated relative bearing angle $\Omega$, and for each scanned angle, (a) rotating seismic receiver data into the true earth frame (east, north, vertical) using the angle from the relative bearing sensor, (b) measuring the polarization angle $\alpha$ of the rotated data in the horizontal plane 21, (c) calculating the azimuth error using a function of the form:

$$azimerr = \sum_{s=1}^{m} \frac{1}{N_s} \sum_{t=1}^{N_s} |lin_t(\alpha_t - azim_s)|$$

where the function represents a weighted sum ($lin_t$=hodogram linearity) of the differences between the source azimuth ($azim_s$) and the estimated azimuth from the polarization ($\alpha_t$). The summation is performed over all shots (t) for a particular seismic source 12a, 12b, 12c or 12x (FIG. 1) and then noimalized by the number of source events ($N_s$) for that source to give an equal contribution from all m sources; and (3) selecting the relative bearing angle closest to the measured relative bearing sensor angle that minimizes the local azimuth error.

While the above method works well for multi-azimuth surveys, it is still subject to errors caused by geological complexity and in certain circumstances, systematic errors in the estimated relative bearing angle Ω may be present. Accordingly, a more effective method of determining the relative bearing angle Ω of a non-gimbaled directional receiver 13 in a borehole 11 is needed.

SUMMARY OF THE DISCLOSURE

A method is disclosed for determining a relative bearing angle of a directional receiver disposed in a deviated borehole and/or a related orientation angle for a directional receiver disposed in a vertical borehole. For the sake of simplicity, the term relative bearing angle and the symbol Ω throughout this specification will refer to both the traditional definition of a relative bearing angle for a receiver in a deviated borehole and an analogous orientation angle for a receiver in a vertical borehole. Specifically, the term relative bearing angle and the symbol Ω throughout this specification will refer to: (1) in the case of a deviated borehole, the angle between the X-axis of the directional receiver and the local vertical plane passing through the deviated borehole and (2) in the case of a vertical borehole, the angle between the X-axis of the directional receiver and true north.

The method includes using the directional receiver to receive a direct compressional arrival generated by at least one seismic source at a known location to generate 3C data. The pre-existing 3D model is employed with an estimated relative bearing angle that is used to rotate the 3C data to a true earth frame. A polarization vector is measured from the rotated 3C data in the 3D model and an incident ray vector of the direct compressional arrival at the directional receiver is estimated using ray-tracing through the 3D model. The polarization vector and incident ray vector are compared. Then, a new relative bearing angle of the directional receiver is selected and the process repeated iteratively until an angular difference between the incident ray vector and the polarization vector is minimized.

In a refinement, the estimated relative bearing angle is generated from measurements made by a relative bearing sensor. The relative bearing sensor may form part of assembly or sonde of the directional receiver.

In a refinement, the minimizing of the difference between the polarization and incident ray vectors fixer comprises searching for the new relative bearing angle that both minimizes the angular difference between the polarization and incident ray vectors and that is closest to the estimated relative bearing angle as measured by a relative bearing sensor.

In another refinement, the estimated relative bearing angle is the angle that provides a local minimum azimuth error.

In a refinement, a plurality of sources are used and the minimizing of the difference between the incident ray vector and the polarization vector comprises minimizing an average angular difference between the incident ray vector and the polarization vector for each source.

In a refinement, the minimizing of the difference between the polarization and incident ray vectors comprises calculating a weighted sum rayerr of a hodogram linearity $lin_t$ of an angular difference between the polarization vector $p_t$ and the incident ray vector $r_t$ for all sources t according to the function:

$$rayerr = \frac{1}{N_s} \sum_{t=1}^{N_s} lin_t(\cos^{-1}(p_t.r_t)).$$

In a refinement, the minimizing further comprises searching for the new relative bearing angle closest to the estimated relative bearing angle and that provides a minimum value for rayerr.

In another refinement, the method further comprises processing the 3C data using the new relative bearing angle for determining a formation property, such as anisotropy.

In the case of a vertical borehole, the pre-existing 3D model is employed with an estimated orientation angle between the X-axis of the directional receiver and true north. This estimated orientation angle is used to rotate the 3C data to the true earth frame. A polarization vector is measured from the rotated 3C data in the 3D model and an incident ray vector of the direct compressional arrival at the directional receiver is estimated using ray-tracing through the 3D model. The polarization vector and incident ray vector are compared. Then, a new orientation angle between the X-axis of the directional receiver and true north is selected and the process repeated iteratively until an angular difference between the incident ray vector and the polarization vector is minimized.

Another method of determining a relative bearing of a directional receiver disposed in a borehole comprises providing a 3D model of the subterranean formation, using the directional receiver to receive a direct compressional arrival generated by at least one source at a known location and generating 3C data therefrom, and rotating the 3C data into a true earth frame using an estimated relative bearing angle. The method then further comprises measuring a polarization vector from the 3D model and estimated bearing angle, and measuring an incident ray vector at the directional receiver by performing ray-tracing in the 3D model for the at least one source. The polarization and incident ray vectors are compared and an angular difference is generated. The method then further comprises generating a weighted sum of an angular difference between the polarization vector $p_t$ and the incident ray vector $r_t$ according to the function $$rayerr = \frac{1}{N_s} \sum_{t=1}^{N_s} lin_t(\cos^{-1}(p_t.r_t))$$

wherein the above function represents the weighted sum of the hodogram linearity $lin_t$ of an angular difference between the polarization vector $p_t$ and the incident ray vector $r_t$ for all sources t. A new relative bearing angle is selected that provides a minimum value for rayerr.

For vertical boreholes, the same function for rayerr may be used but instead of modifying the relative bearing angle, the orientation angle between the X-axis of the tool and true north is modified to minimize rayerr or, alternatively minimize the angular difference between $p_t$ and $r_t$ in a similar function or iterative calculation.

Another method of determining the relative bearing angle of a directional receiver disposed in a borehole is disclosed that comprises: a) using the directional receiver to receive a direct P-wave generated by a source and generating 3C data from the P-wave; b) estimating a relative bearing angle of the directional receiver; c) rotating the 3C data into the true earth frame using the estimated relative bearing angle; d) measuring a polarization vector of the rotated 3C data in the 3D model; e) performing ray tracing in the 3D model for the source and directional receiver and estimating an incident ray vector at the directional receiver; f) calculating for all source events a weighted sum of an angular difference between the polarization vector and incident ray vector; and g) repeating parts (c) through (f) for different and new relative bearing angles until a new estimated relative bearing angle is found that results in a minimum angular difference between the polarization vector and incident ray vector.

A method for processing vertical seismic profile data is also disclosed that comprises: a) providing a 3D model for a subterranean formation between a borehole and multiple sources; b) receiving direct compressional arrivals generated by multiple source events using a directional receiver in the borehole; c) receiving an estimated relative bearing angle from a relative bearing sensor or other means; d) rotating the seismic data into the true earth frame using the estimated relative bearing angle, thereby creating rotated seismic data; e) measuring a polarization vector of the rotated seismic data; f) estimating an incident ray vector of the direct compressional arrivals at the directional receiver using ray-tracing through the 3D model; g) calculating for all source events the weighted sum of an angular difference between the polarization vector and the incident ray vector for each source and for each source event; h) adjusting the estimated relative bearing angle and repeating parts (d) through (g) until the angular difference between the polarization vectors and incident ray vectors is minimized; and i) generating an adjusted vertical seismic profile by adjusting the seismic data using the estimated relative bearing angle of part (h).

A method for generating a geological model using the relative bearing of a directional receiver is also disclosed that comprises: a) defining a 3D geologic model using a vertical seismic profile configuration, the configuration having seismic source and directional receiver geometry defined; b) generating seismic data using seismic source events and direct compressional arrivals at the directional receiver; c) estimating a relative bearing angle of the directional receiver in the defined 3D geologic model; d) rotating the seismic data into the true earth frame using the estimated relative bearing angle, thereby creating rotated seismic data; e) measuring a polarization vector of the rotated seismic data in the defined 3D geological model; f) estimating an incident ray vector of the direct compressional arrivals at the directional receiver using ray-tracing through the defined 3D geological model; g) calculating for all source events the weighted sum of an angular difference between the polarization vector and the incident ray vector for each source and for each source event; h) selecting a new relative bearing angle that results in a minimization of the angular difference between the polarization vectors and incident ray vectors; and i) adjusting the defined 3D geological model from the initial geometry to a new geometry based on the new relative bearing.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 1 is a general illustration of a seismic receiver deployed in a deviated borehole and multiple seismic sources;

FIG. 2B further illustrates the relative bearing angle $\Omega$ in the X-Y plane of the tool;

FIG. 10 graphically illustrates the results of a relative bearing angle estimation using the prior art azimuth-based method for a single source (line 33), the azimuth-based prior art method of the '373 patent (line 35) and the disclosed model-based method (line 36) for the concentric source pattern shown in FIGS. 7 and 8.

It should be understood that the drawings are not necessarily to scale and that the disclosed embodiments are illustrated diagrammatically, graphically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 3:
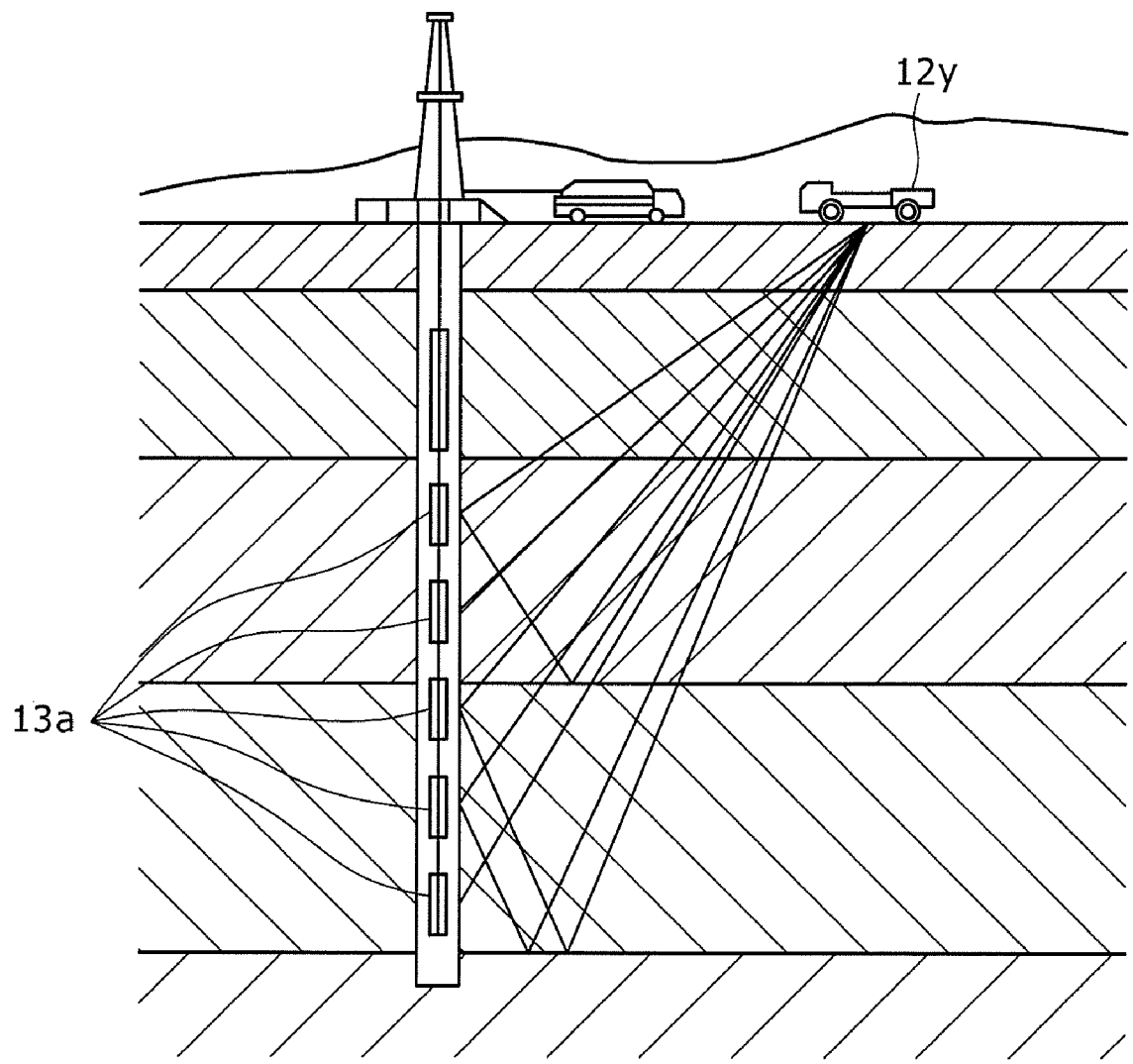
FIG. 3 is a general illustration of multiple directional receivers deployed in a borehole and a single movable seismic source.
Figure 7:
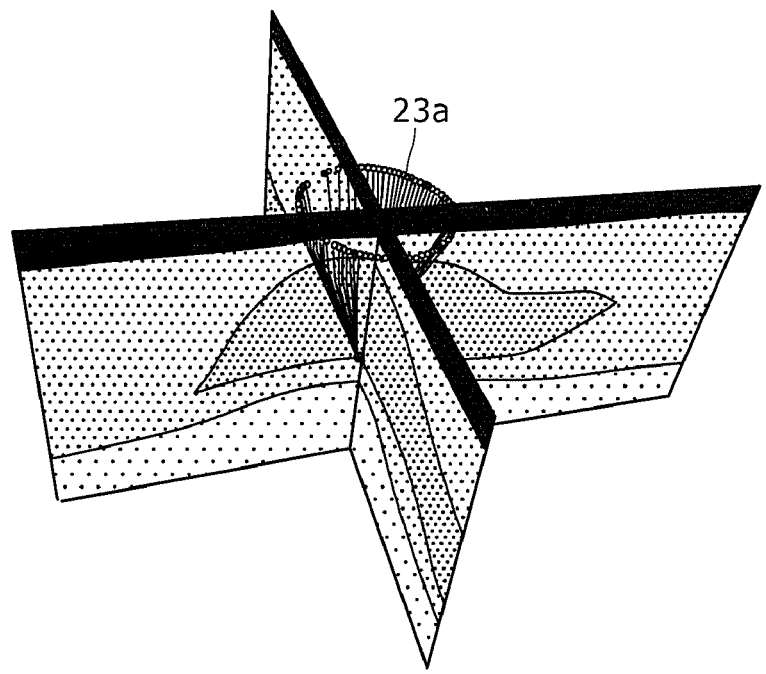
FIG. 7 illustrates ray tracings for a concentric set of seismic shots through a 3D salt model.
Figure 8:
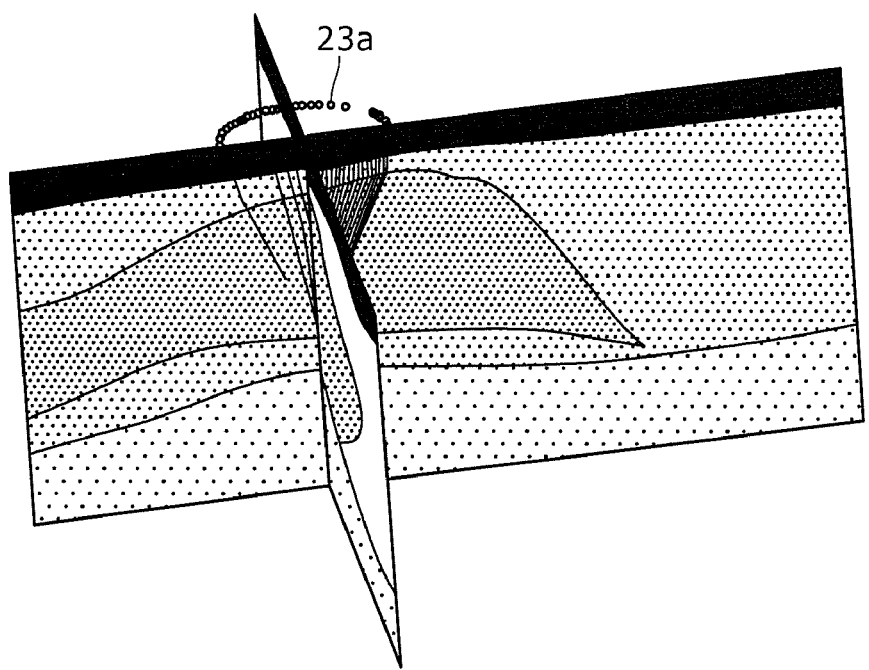
FIG. 8 is another view of the ray tracings illustrated in FIG. 7.

It is common to have a 3D model available when designing large-scale borehole seismic surveys. Further, it is likely that these 3D models will also be used for hydraulic fracture monitoring (HFM) and micro-seismic reservoir monitoring (MRM) applications. To improve the accuracy of 3D models and VSPs in general, new methods for 3C directional receiver orientation are disclosed herein. It will be noted that the disclosed methods apply to any 3C directional receiver tool and is not limited to seismic directional receivers like the one shown at 13 in FIG. 1 or the string of spaced directional receivers 13a illustrated in FIG. 3. Further, while land-based seismic sources at various locations are shown at 12a . . . 12x and 12y in FIGS. 1 and 3, the disclosed methods are also equally applicable to off-shore operations where the seismic sources 12a 12y would be associated with a boat or ship and disposed at or near the surface of the water surface or at or near the ocean floor. As illustrated in FIGS. 7 and 8, the pattern or arrangement of the seismic sources 12 can vary, but typically include one or more concentric circular shot patterns 23a.

Figure 2A:
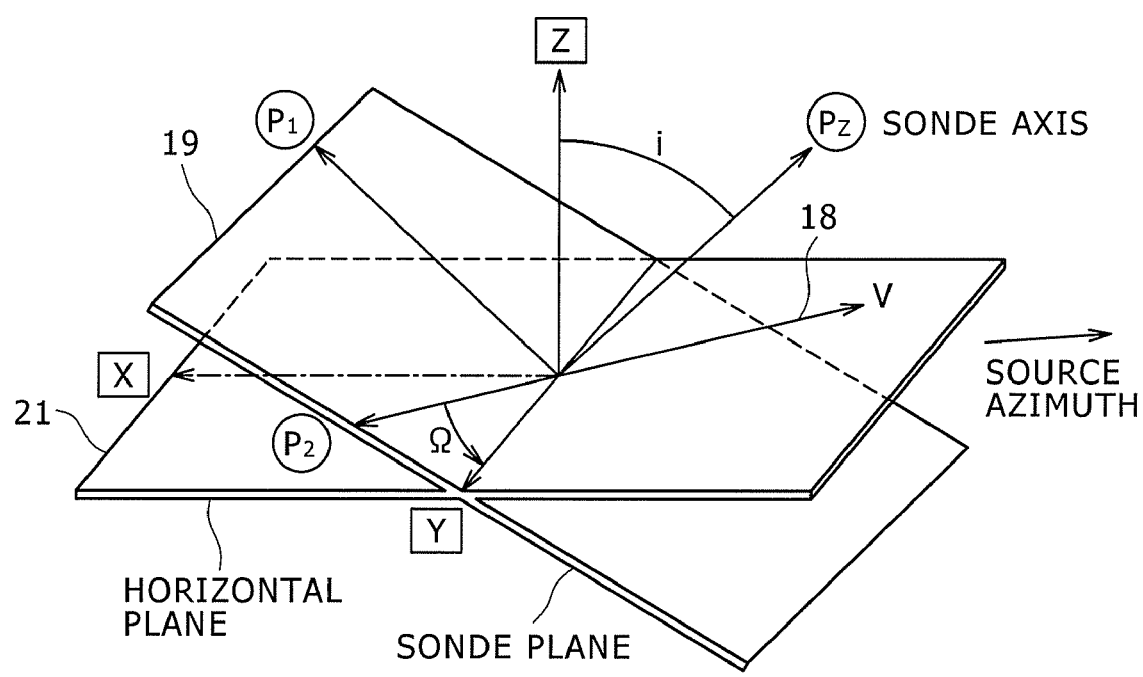
FIG. 2A is a diagram of the coordinate axes and orientation angles representative of sensor and borehole orientations for the seismic receiver and borehole illustrated in FIG. 1.

For deviated boreholes, the disclosed method assumes an initial estimated relative bearing angle Ω. Recognizing that relative bearing angles Ω measured by sensors disposed on receivers 13 are relatively inaccurate, the relative bearing angle Ω may be measured, assumed, scanned or estimated. Using the estimated relative bearing angle Ω, the 3C data received at the directional receiver 13 is rotated through the estimated relative bearing angle Ω towards a true earth coordinate (east, north, vertical) as shown in FIG. 2A. Using a pre-existing 3D model, the polarization angle α or, more preferably, the polarization vector $p_t$ is measured from the rotated 3C data. Then, ray-tracing of the P-wave arrivals 18 in the 3D model for all seismic sources 12a-12y and all directional receivers 13, 13a is performed and an incident ray vector $r_t$ for each ray-tracing is calculated. An angular difference or an angle between the incident ray vector $r_t$ and the polarization vector $p_t$ is calculated.

The sum of these angular differences for all seismic sources 12a-12y locations provides an objective function that describes the quality of fit between the 3D model and the seismic data for the estimated relative bearing angle Ω. A simple line search can find the relative bearing angle Ω that minimizes the angular difference between the polarization vector $p_t$ and the incident ray vector $r_t$. Applicants have found that the relative bearing angle Ω that minimizes this function is the relative bearing angle Ω that provides the best agreement between the 3D modeled rays and the acquired data and therefore should be used for further processing. The same type of objective function may be used for other model calibration applications, such as ray-based tomography, etc.

Figure 9:
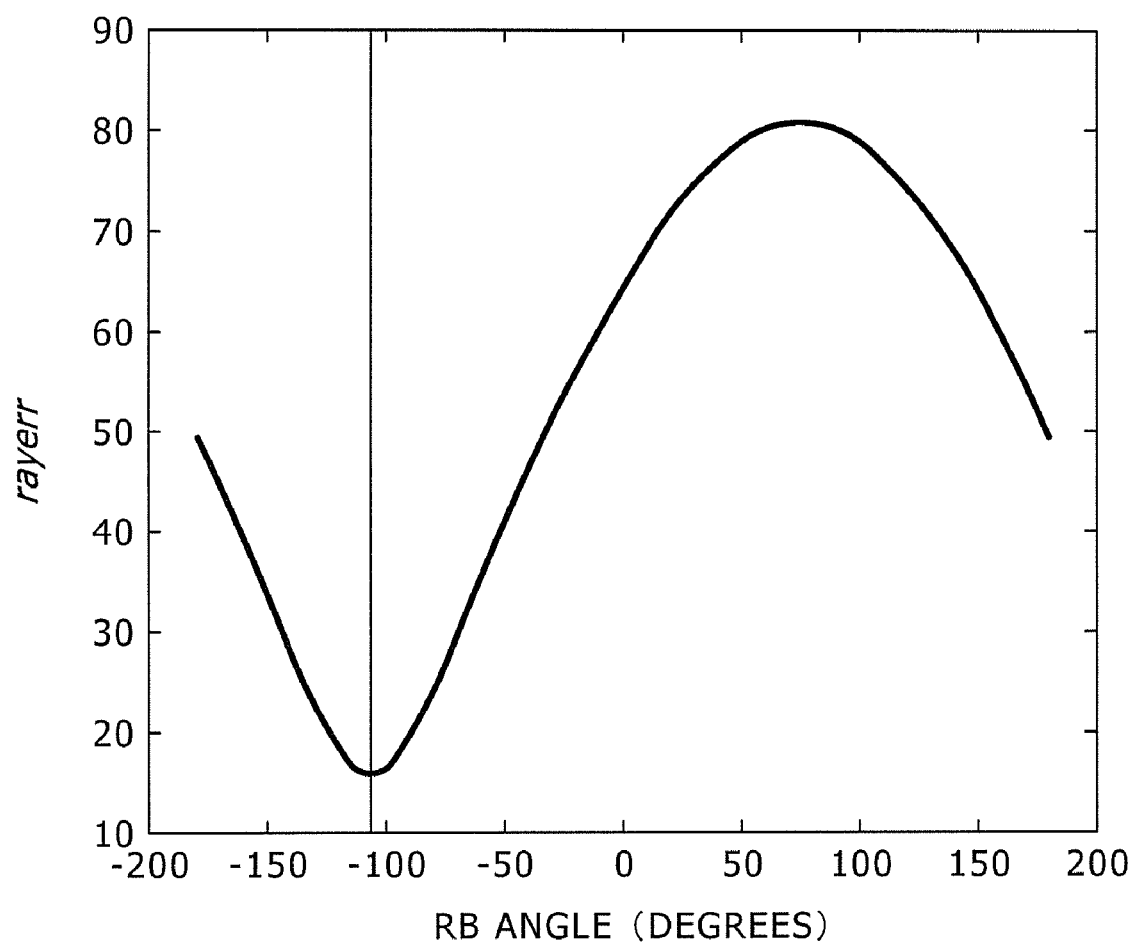
FIG. 9 illustrates the minimization technique of the disclosed method for a single 3C receiver which defines the relative bearing angle using the salt model illustrated in FIGS. 7-8 at $-106.3°$.

A simple line search as illustrated in FIG. 9 can find the relative bearing angle Ω that minimizes the objective function and the relative bearing angle Ω that provides the best fit or agreement between the modeled rays and the acquired data is the relative bearing angle Ω that is used for further processing. The same type of objective function may be used for other model calibration applications, such as ray-based tomography, etc.

Accordingly, one disclosed method comprises: rotating the 3C data into the true Earth frame (east, north, vertical) using an estimated relative bearing angle Ω obtained from a relative bearing sensor 22 or other source; measuring the polarization vector $p_t$ of the rotated data in 3D (automated windowing); performing ray-tracing in the model for all seismic sources 12-12y and the current directional receiver 13; outputting the incident ray vectors $r_t$ for each ray-tracing at the current directional receiver 13; creating a function of the form:

$$rayerr = \frac{1}{N_s} \sum_{t=1}^{N_s} lin_t(\cos^{-1}(p_t \cdot r_t))$$

wherein the above function represents the weighted sum ($lin_t$=hodogram linearity) of the angular difference between the polarization vector $p_t$ and the ray vector $r_t$ for one of the receivers 13 and for all seismic sources 12a-12y; and searching for a new relative bearing angle Ω that gives a minimum in rayerr. Preferably, when two or more new relative bearing angles Ω provide a minimum value for rayerr, the new relative bearing angle Ω that is closest to the original estimated relative bearing angle Ω is selected.

The above method includes no systematic errors as the relative bearing angle Ω is optimized and the polarization angle α is accurately calculated from the rotated 3C data. As the accuracy of the relative bearing angle Ω improves, so does the accuracy of the polarization angle α and resulting polarization vectors $p_t$. In another refinement, the method further comprises processing the 3C data using the new relative bearing angle for determining a formation property, such as anisotropy. Further, wide source azimuth coverage is not required and the use can determine which source locations have the largest relative bearing angle Ω errors.

The disclosed method is useful for both deviated and vertical boreholes. In the case of a vertical borehole 11, the pre-existing 3D model is employed with an estimated angle between the X-axis of the directional receiver and true north as opposed to the local vertical plane of the borehole. This estimated angle is used to rotate the 3C data to the true earth frame. A polarization vector $p_t$ is measured from the rotated 3C data in the 3D model and an incident ray vector $r_t$ of the direct compressional arrival at the directional receiver 13 is estimated using ray-tracing through the 3D model. The polarization vector $p_t$ and incident ray vector $r_t$ are compared. Then, a new angle between the X-axis of the directional receiver 13 and true north is selected and the process repeated iteratively until an angular difference between the incident ray vector $r_t$ and the polarization vector $p_t$ is minimized.

Figure 4:
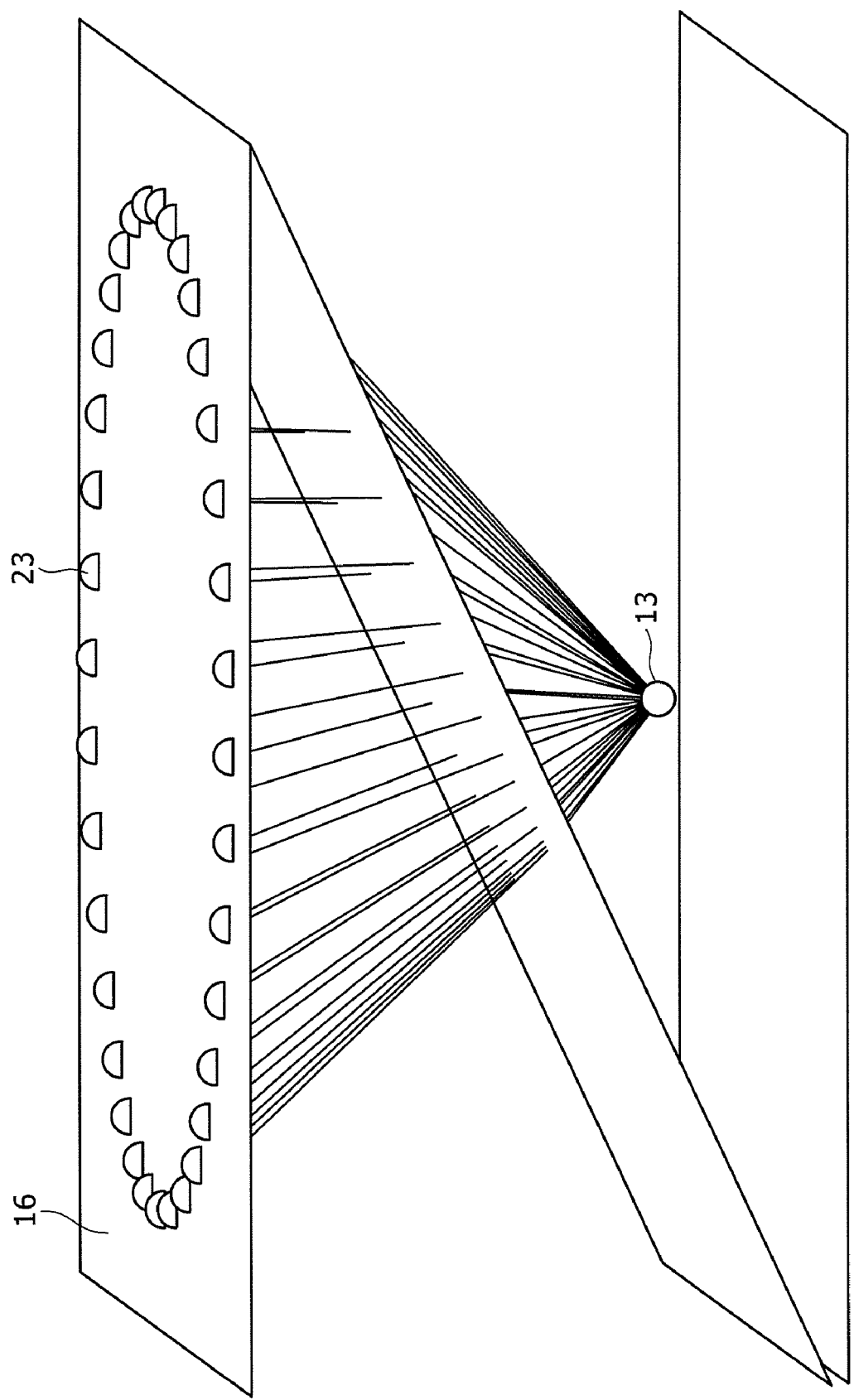
FIG. 4 is a synthetic 3D model of a subterranean formation with ray tracings of concentrically arranged shots.
Figure 5:
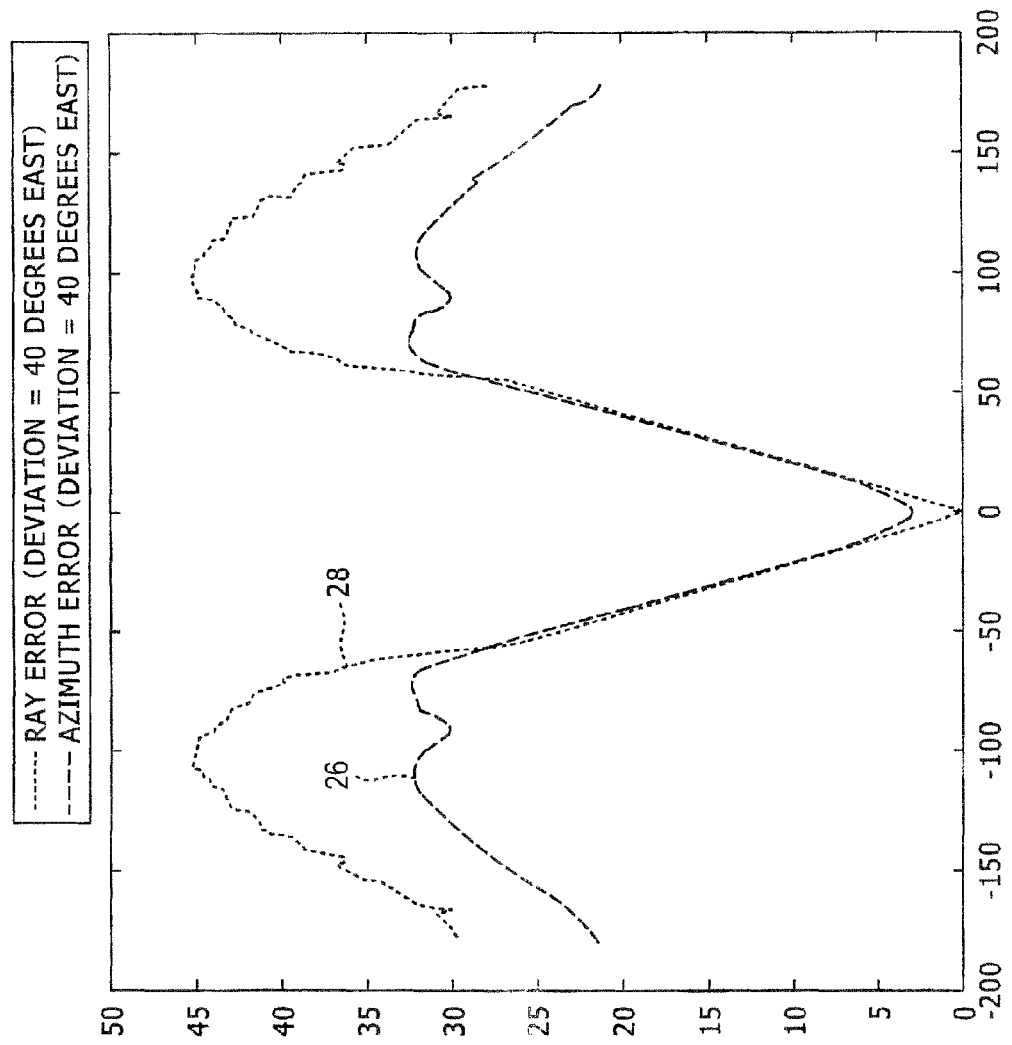
FIG. 5 graphically illustrates the inability of the prior art relative bearing estimation method to reduce the azimuth error to zero, in contrast to the disclosed method wherein the error is defined by the angular difference between the polarization vector and the incident ray vector, which results in zero azimuth error.
Figure 6:
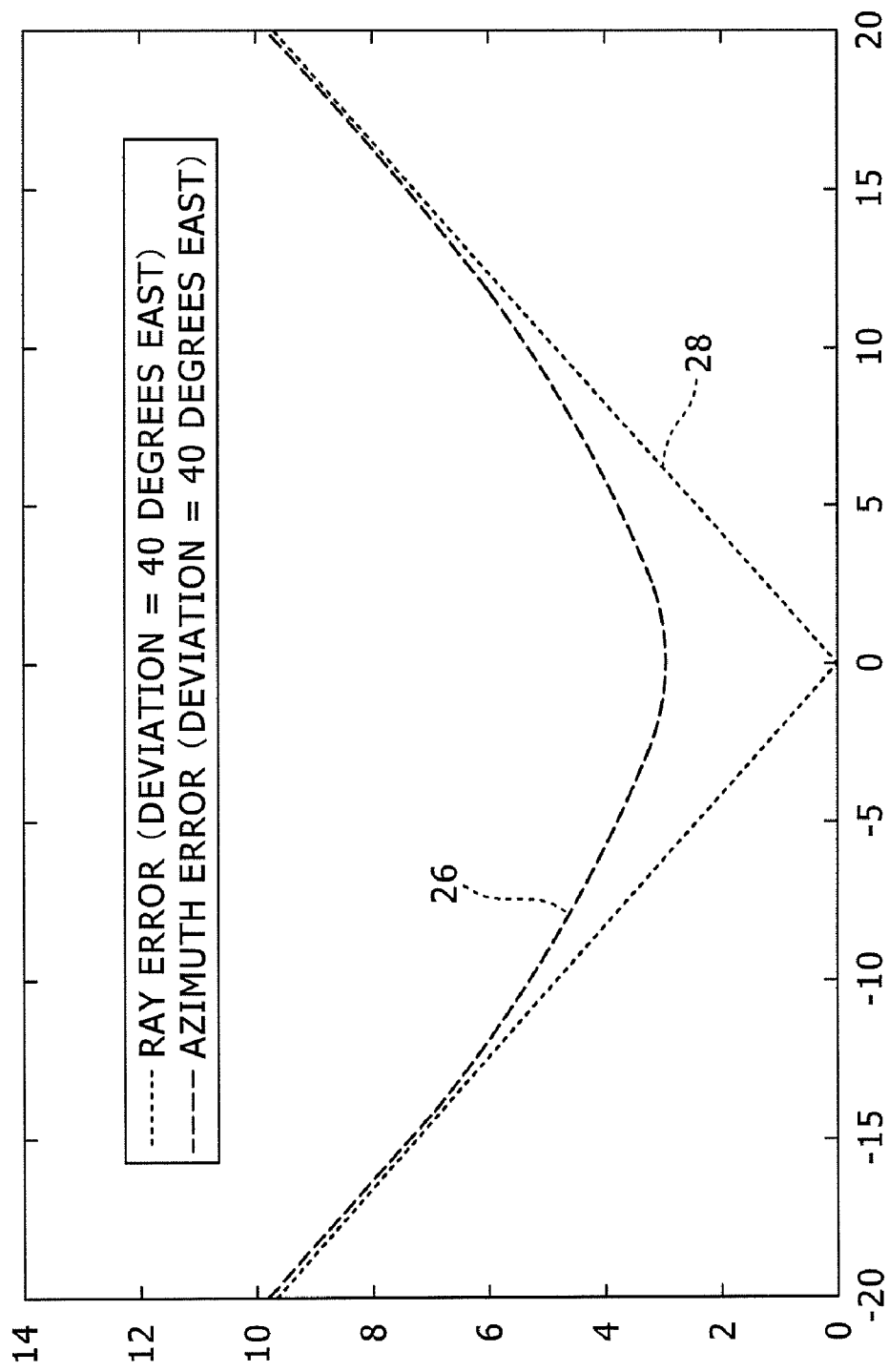
FIG. 6 is an expanded and partial graphical presentation of the data of FIG. 5.

FIG. 4 is an example of a synthetic 3D model. The ray tracings for a concentric shot pattern 23 are shown extending from the surface 16 to a directional receiver 13. FIGS. 5 and 6 illustrate the inability of prior art models to minimize the difference between the polarization vector $p_t$ and incident ray vector $r_t$. Specifically, the plot line 26 represents an effort to calculate a relative bearing angle Ω using the prior art technique discussed above that relies upon the difference between the polarization angle α in the horizontal plane and the true source azimuth $azim_s$. As seen in FIGS. 5 and 6, the prior art technique does not reach a zero value for the synthetic 3D model of FIG. 4 for the azimerr function. In contrast, the plot line 28 results in a zero value for the rayerr function which is accurate for synthetic 3D model of FIG. 4.

FIGS. 7-8 illustrate a 3D model for a real seismic acquisition. A concentric or circular shot pattern 23a was used to acquire VSP data with 83 receivers in the borehole. Referring to FIG. 9, using the techniques described herein that select a relative bearing value by minimizing the differences between the polarization vector $p_t$ and incident ray vector $r_t$, a minimum value for the rayerr function occurs at a relative bearing angle Ω of −106.3° for the receiver no. 8 of the seismic acquisition of FIGS. 7-8.

FIG. 10 illustrates the general agreement between prior art relative bearing angle Ω calculation techniques and those disclosed herein. Specifically, turning to FIG. 10, prior art techniques are graphically illustrated by lines 33 and 35 while the disclosed method is illustrated by the line 36. A total of eight directional receivers were utilized. The line 33 represents single walkaway line of spaced shots or source events. Lines 35 and 36 are generated using the same concentric circle of shots (FIGS. 7 and 8), using the previous azimuth-based method and the new model-based method respectively. Accurate determination of the relative bearing angle Ω of directional receivers 13, 13a in a borehole 11 is important in determining formation properties such as anisotropy. The disclosed methods for determining the relative bearing angle Ω of the directional receivers that provides accuracy and confidence needed to evaluate formation properties using VSP data. For example, walkaround VSPs can be used to measure anisotropy for fractured reservoir characterization by using VSP data from several source points arranged azimuthally around directional receivers deployed in a borehole to determine the anisotropy directions through an examination of the relative amplitudes recorded in the radial and transverse directions. To perform this examination, the data must be rotated into the radial, transverse and vertical coordinate system for each of the source points and events. As the relative amplitudes may vary only slightly, a small error in sensor orientation can significantly affect the anisotropy determination. It can be appreciated that a robust method of orientating directional receivers, such as the disclosed methods is important.

The disclosed methods also are useful in geologic modeling. The relative bearing Ω of directional receivers 13 in a borehole 11 can be used for tasks such as processing VSP data, designing a VSP survey or generating synthetic seismic data. An initial relative bearing angle Ω is approximated. If relative bearing sensor 22 is available, its data may be used to approximate an initial relative bearing angle Ω. Then, a disclosed method for determining relative bearing angle Ω of a directional receiver 13 in a borehole 11 is applied. The model output, such as VSP data, VSP survey design, or synthetic seismic data, can then be adjusted based on the selected relative bearing angle Ω. These steps can be repeated to refine and adjust a geologic model.

One particular application is design of a VSP survey configuration that is less sensitive to the relative bearing angle Ω of directional receivers 13 in a borehole 11. This can be accomplished by providing an initial geologic model, providing an initial VSP survey configuration, generating synthetic seismic data and rotating the data to the true earth frame using an estimated relative bearing angle Ω, selecting a new relative bearing angle Ω using one of the disclosed methods, adjusting the survey configuration to refine the relative bearing angle Ω, and repeating these steps until a VSP survey configuration is achieved that provides a sufficiently refined relative bearing angle Ω. The type of formation properties to be measured with the VSP may influence the degree of refinement in relative bearing necessary.

It is noted that the disclosed methods may be used to orientate any type of seismic data received by a borehole seismic sensor or directional receiver.

While only certain embodiments have been set forth, alternatives and modifications will be apparent from the above description to those skilled in the art. These and other alternatives are considered equivalents and within the spirit and scope of this disclosure and the appended claims.

The invention claimed is:

1. A method of determining a relative bearing of a directional receiver disposed in a borehole extending into a subterranean formation for which a 3D model is provided, the method comprising:
   using the directional receiver to receive a direct compressional arrival generated by at least one source at a known location to generate 3C data;
   rotating the 3C data to a true Earth frame using an estimated relative bearing angle;
   measuring a polarization vector from the rotated 3C data;
   estimating an incident ray vector of the direct compressional arrival at the directional receiver using ray-tracing through the 3D model; and
   selecting a new relative bearing angle of the directional receiver from a plurality of candidate relative bearing angles based on the candidate relative bearing angle that minimizes an error determined based at least in part on a linear hodogram of an inverse cosine of a dot product of the incident ray vector and the polarization vector.

2. The method of claim 1 wherein the estimated relative bearing and new bearing angle each are an angle between an X-axis of the directional receiver and true north.

3. The method of claim 1 wherein the estimated relative bearing and new bearing angle each are an angle between an X-axis of the directional receiver and a local vertical plane that passes through the borehole.

4. The method of claim 1, wherein the estimated relative bearing angle is generated from measurements made by a relative bearing sensor.

5. The method of claim 4, wherein the minimizing of the difference further comprises searching for the new relative bearing angle that is closest to the estimated relative bearing angle measured by the relative bearing sensor.

6. The method of claim 5, further comprising processing the 3C data using the new relative bearing angle for determining a formation property.

7. The method of claim 1, wherein the estimated relative bearing angle is selected from a plurality of scanned angles and is the scanned angle that provides a local minimum azimuth error $$rayerr = \frac{1}{N_s} \sum_{t=1}^{N_s} lin_t(\cos^{-1}(p_t.r_t))$$

8. The method of claim 1, wherein a plurality of sources are used and the minimizing of the difference between the incident ray vector and the polarization vector comprises minimizing an average angular difference between the incident ray vector and the polarization vector for each source.

9. The method of claim 1, wherein the minimizing of the difference comprises calculating a weighted sum rayerr of hodogram linearity $lin_t$ of an angular difference between the polarization vector $p_t$ and the incident ray vector $r_t$ for all sources t according to the function:

$$rayerr = \frac{1}{N_s} \sum_{t=1}^{N_s} lin_t(\cos^{-1}(p_t.r_t))$$

and searching for the new relative bearing angle that provides a minimum value for rayerr.

10. The method of claim 9, wherein the minimizing further comprises searching for the new relative bearing angle closest to the estimated relative bearing angle and that provides a minimum value for rayerr.

11. The method of claim 1, wherein the directional receiver is a seismic receiver.

12. The method of claim 11, wherein the formation property is anisotropy.

13. A method of determining a relative bearing of a directional receiver disposed in a borehole extending at least partially through a subterranean formation for which a 3D model is provided, the method comprising:
   using the directional receiver to receive a direct compressional arrival generated by at least one source at a known location and generating 3C data therefrom;
   rotating the 3C data into a true earth frame using an estimated relative bearing angle;

measuring a polarization vector from the 3C data;
measuring an incident ray vector at the directional receiver by performing ray-tracing in the 3D model for the at least one source;
generating a weighted sum of an angular difference between the polarization vector $p_t$ and the incident ray vector $r_t$ according to the function $$rayerr = \frac{1}{N_s}\sum_{t=1}^{N_s} lin_t(\cos^{-1}(p_t, r_t))$$

wherein the above function represents the weighted sum of a hodogram linearity lint of the angular difference between the polarization vector $p_t$ and the incident ray vector r for all sources t; and
searching for a new relative bearing angle that provides a minimum value for rayerr.

14. The method of claim 13 wherein the estimated relative bearing and new bearing angle each are an angle between an X-axis of the directional receiver and true north.

15. The method of claim 13 wherein the estimated relative bearing and new bearing angle each are an angle between an X-axis of the directional receiver and a local vertical plane that passes through the borehole.

16. The method of claim 13, wherein the estimated relative hearing angle is generated from measurements made by a relative bearing sensor.

17. The method of claim 13, wherein the estimated relative hearing angle is selected from a plurality of scanned angles and is an angle that provides a local minimum azimuth error.

18. The method of claim 13, wherein the minimizing of rayerr further comprises searching for the new relative bearing angle that is closest to the estimated relative bearing angle.

19. The method of claim 18, wherein the estimated relative bearing angle is measured by a relative bearing sensor disposed in the borehole.

20. The method of claim 13, wherein the directional receiver is a seismic receiver.

21. The method of claim 20, further comprising processing the 3C data using the new relative bearing angle for determining a formation property.

22. The method of claim 21, wherein the formation property is anisotropy.

23. A method of determining the relative bearing angle of a directional receiver disposed in a borehole that extends into a subterranean formation for which a 3D model is available, the method comprising:
   a) using the directional receiver to receive a direct P-wave generated by a source and generating 3C data from the P-wave;
   b) estimating a relative bearing angle of the directional receiver;
   c) rotating the 3C data into a true earth frame using the estimated relative bearing angle;
   d) measuring a polarization vector of the rotated 3C data in the 3D model;
   e) performing ray tracing in the 3D model for the source and the directional receiver and calculating an incident ray vector at the directional receiver;
   f) calculating for all source events a weighted sum of an angular difference between the polarization vector and incident ray vector according to a linear hodogram of an inverse cosine of a dot product of the incident ray vector and the polarization vector;
   g) repeating parts (c) through (f) for different estimated relative bearing angles until a new relative bearing angle is found that results in a minimum angular difference between the polarization vector and incident ray vector.

24. The method of claim 23 wherein the estimated relative bearing and new bearing angle each are an angle between an X-axis of the directional receiver and true north.

25. The method of claim 23 wherein the estimated relative hearing and new bearing angle each are an angle between an X-axis of the directional receiver and a local vertical plane that passes through the borehole.

26. The method of claim 23 wherein the estimating of the relative bearing angle comprises using a downhole relative bearing sensor.

27. The method of claim 26, wherein the directional receiver is a seismic receiver.

28. The method of claim 23, further comprising using the new relative bearing angle to determine a formation property.

29. The method of claim 28 wherein the formation property is anisotropy.

30. A method for processing vertical seismic profile data comprising:
   a) providing a 3D model for a subterranean formation between a borehole and multiple sources;
   b) receiving direct compressional arrivals generated by multiple source events using a directional receiver in the borehole and generating seismic data therefrom;
   c) receiving an estimated relative bearing angle from a relative bearing sensor;
   d) rotating the seismic data into a true earth frame using the estimated relative bearing angle. thereby creating rotated seismic data;
   e) measuring a polarization vector of the rotated seismic data;
   f) estimating an incident ray vector of the direct compressional arrivals at the directional receiver using ray-tracing through the 3D model;
   g) calculating for all source events a weighted sum of an angular difference between the polarization vector and the incident ray vector for each source and for each source event according to a linear hodogram of an inverse cosine of a dot product of the incident ray vector and the polarization vector;
   h) adjusting the estimated relative bearing angle and repeating parts (d) through (g) until the angular difference between the polarization vectors and incident ray vectors is minimized;
   i) generating an adjusted vertical seismic profile by adjusting the seismic data using the estimated relative bearing angle of part (h).

31. The method of claim 30 wherein the estimated relative bearing and new bearing angle each are an angle between an X-axis of the directional receiver and true north.

32. The method of claim 30 wherein the estimated relative hearing and new bearing angle each are an angle between an X-axis of the directional receiver and a local vertical plane that passes through the borehole.

33. The method of claim 30, further comprising using the adjusted vertical seismic profile to determine a formation property.

34. The method of claim 33, wherein the formation property is anisotropy.

35. The method of claim 30, wherein the directional receiver is a three-component (3C) directional receiver.

36. A method for adjusting a geological model using the relative bearing angle of a directional receiver comprising:
   a) defining a 3D geologic model using a vertical seismic profile configuration;
   b) generating seismic data using seismic source events and direct compressional arrivals at the directional receiver;
   c) using a downhole sensor to accurately measure the relative bearing angle of the directional receiver;
   d) rotating the seismic data into a true earth frame using the measured relative bearing angle, thereby creating rotated seismic data;
   e) measuring a polarization vector of the rotated seismic data in the defined 3D geological model;
   f) estimating an incident ray vector of the direct compressional arrivals at the directional receiver using ray-tracing through the defined 3D geological model;
   g) calculating for all source events a weighted sum of an angular difference between the polarization vector and the incident ray vector for each source and for each source event according to a linear hodogram of an inverse cosine of a dot product of the incident ray vector and the polarization vector;
   h) adjusting the defined 3D geological model to a new geometry based on a new relative bearing angle that reduces the weighted sum of the angular difference between the polarization vectors and incident ray vectors thereby providing an improved model.

37. The method of claim 36 wherein the estimated relative hearing and new bearing angle each are an angle between an X-axis of the directional receiver and true north.

38. The method of claim 36 wherein the estimated relative bearing and new bearing angle each are an angle between an X-axis of the directional receiver and a local vertical plane that passes through the borehole.

39. The method of claim 36 further comprising determining a formation property using the adjusted defined 3D geological model.

* * * * *